United States Patent
Buckley et al.

(10) Patent No.: US 10,361,839 B2
(45) Date of Patent: Jul. 23, 2019

(54) ENCRYPTION IN WIRELESS COMMUNICATION SYSTEMS

(71) Applicant: BlackBerry Limited, Waterloo (CA)

(72) Inventors: Michael Eoin Buckley, Crystal Lake, IL (US); Shu-Lin Chen, Kanata (CA); Claude Jean-Frederic Arzelier, Molieres-sur-Ceze (FR)

(73) Assignee: BlackBerry Limited, Waterloo, Ontario (CA)

( * ) Notice: Subject to any disclaimer, the term of this patent is extended or adjusted under 35 U.S.C. 154(b) by 112 days.

(21) Appl. No.: 15/400,346

(22) Filed: Jan. 6, 2017

(65) Prior Publication Data
US 2018/0198600 A1 Jul. 12, 2018

(51) Int. Cl.
| H04L 5/00 | (2006.01) |
| H04L 9/00 | (2006.01) |
| H04L 9/08 | (2006.01) |
| H04L 29/06 | (2006.01) |
| H04W 12/02 | (2009.01) |
| H04W 76/11 | (2018.01) |

(52) U.S. Cl.
CPC ............ H04L 9/002 (2013.01); H04L 5/00 (2013.01); H04L 63/0428 (2013.01); H04W 12/02 (2013.01); H04W 76/11 (2018.02); H04L 9/0861 (2013.01); H04L 2209/80 (2013.01)

(58) Field of Classification Search
None
See application file for complete search history.

(56) References Cited

U.S. PATENT DOCUMENTS

| 8,855,303 | B1 | 10/2014 | Glatfelter et al. |
| 9,603,136 | B2 * | 3/2017 | Hsieh ............... H04L 5/001 |
| 9,635,659 | B2 * | 4/2017 | Gaal ............... H04L 1/1867 |
| 9,839,018 | B2 * | 12/2017 | Berggren .......... H04W 72/042 |
| 9,960,911 | B2 * | 5/2018 | Shanmugam ........ H04L 9/0662 |
| 2015/0036625 | A1 * | 2/2015 | Nam ............... H04L 5/0094 370/329 |
| 2017/0279778 | A1 * | 9/2017 | Lee ................ H04L 63/0428 |
| 2017/0289108 | A1 * | 10/2017 | Lee ................ H04L 5/0055 |

(Continued)

FOREIGN PATENT DOCUMENTS

| EP | 1992189 | 11/2008 |
| WO | 2007095471 | 8/2007 |
| WO | WO 2018/004631 A1 * | 1/2018 ............ H04L 5/00 |

OTHER PUBLICATIONS

3GPP Ts 36.213, "3 Generation Partnership Project; Technical Specification Group Radio Access Network; Evolved Universal Terrestrial Radio Access (E-UTRA); Physical layer procedures (Release 10)," 3GPP Standard vol. RAN WG1; No. V10.13.0, Jun. 25, 2015, 128 pages.

(Continued)

*Primary Examiner* — Christopher A Revak
(74) *Attorney, Agent, or Firm* — Fish & Richardson P.C.

(57) ABSTRACT

A method for encryption in a wireless communication system includes encrypting, at a base station, data of a physical layer control channel using at least one of a control channel type, a radio resource aggregation level of the control channel, a radio resource index of the control channel, or a subcarrier frequency of the control channel; and transmitting the encrypted data to a user equipment (UE), where the UE is in a cell of the base station.

23 Claims, 5 Drawing Sheets

(56) References Cited

U.S. PATENT DOCUMENTS

2018/0026740 A1\* 1/2018 Chen .................... H04L 1/0009
370/328
2018/0227942 A1\* 8/2018 Hwang ................ H04L 1/0045

OTHER PUBLICATIONS

3GPP TSG-SA3, "3 Generation Partnership Project: Meeting #18", 3GPP XP055451733, presented May 21-24, 2001, 3 pages.
Uijin Jang et al., "Privacy-Enhancing Security Protocol in LTE Initial Attack," Symmetry vol. 6, No. 4, Dec. 12, 2014, 15 pages.
European Extended Search Report in European Application No. 18150215.4, dated Mar. 7, 2018, 14 pages.
3GPP TS 43.020, "3rd Generation Partnership Project; Technical specification group services and system Aspects; Security related network functions," version 13.2.0, Jun. 2016, 123 pages.
3GPP TS 24.301, "3rd Generation Partnership Project; Technical Specification Group Core Network and Terminals; Non-Access-Stratum (NAS) protocol for Evolved Packet System (EPS)," version 13.6.1, Jun. 2016, 452 pages.
Jover, "LTE security and protocol exploits," Schmoocon 2016, 47 pages, <http://www.ee.columbia.edu/~roger/ShmooCon_talk_final_01162016.pdf>.
3GPP TS 33.401, "3rd Generation Partnership Project; Technical Specification Group Services and System Aspects, 3GPP System Architecture Evolution (SAE); Security architecture," version 13.3.0, Jun. 2016, 148 pages.
3GPP TS 33.401, "3rd Generation Partnership Project; Technical Specification Group Services and System Aspects; 3GPP System Architecture Evolution (SAE); Security architecture," version 13.4.0, Sep. 2016, 149 pages.
3GPP TS 36.212, "3rd Generation Partnership Project; Evolved Universal Terrestrial Radio Access (E-UTRA); Multiplexing and channel coding," version 13.2.0, Jun. 2016, 140 pages.
3GPP TS 24.008, "3rd Generation Partnership Project; Technical Specification Group Core Network and Terminals; Mobile radio interface Layer 3specification; Core network protocols; Stage 3," version 13.8.0, Release 13, Dec. 2016, 761 pages.
3GPP TS 24.008, "3rd Generation Partnership Project; Technical Specification Group Core Network and Terminals; Mobile radio interface Layer 3specification; Core network protocols; Stage 3," Release 14, version 14.2.0, Dec. 2016, 765 pages.
3GPP TS 36.323, "3rd Generation Partnership Project; Evolved Universal Terrestrial Radio Access (E-UTRA); Packet Data Convergence Protocol (PDCP) specification," version 13.3.0, Sep. 2016, 39 pages.
Hongyan, "PDCCH Dimensioning," Expert Opinion, LTE University, Sep. 19, 2011, 2 pages, <http://lteuniversity.com/get_trained/expert_opinion1/b/hongyanlei/archive/2011/09/19/pdcch-dimensioning.aspx>.
"LTE Quick Reference," ShareTechnote, 5 pages, <http://www.sharetechnote.com/html/Handbook_LTE_CCE_Index.html#Ref_1>.
Barkan et al., "Instant Ciphertext-Only Cryptanalysis of GSM Encrypted Communication," <https://cryptome.org/gsm-crack-bbk.pdf>.
European Office Action issued in European Application No. 18150215.4, dated Feb. 2, 2019, 6 pages.

\* cited by examiner

5.3.3.2 CRC attachment 5.3.3.2.1 Encryption sequence

Inputs to generate the encryption sequence are:

- Key: The key used is a 128 bit key and is computed by the UE.
- Channel type (DCI Format), 5 bits, forms an input to the encryption algorithm.
- Control Channel Element (CCE) resources indicator. This is a 2 bits field that indicates whether 1, 2, 4 or 8 resources are used in the cell (mapping respectively to 00, 01, 10 and 11).
- Subframe & Frame numbers. They indicate the subframe & frame in which the particular DCI control channel is transmitted/received.

The subframe number consists of 4 bits indicating subframe 0, ..., 9.

The frame number is the SFN (system frame number) consisting of 10 bits.

- Reference parameter. Consists of 16 bits. This takes initially the value of the RNTI and gets incremented by one each time that the frame number wraps around. After that the Reference parameter reaches its maximum value and the frame number wraps around, the Reference parameter takes the value of 16 bits equal to '0' (i.e. it wraps around).

16 bits are outputted from the cipher to produce $e_0, e_1, ..., e_{15}$.

5.3.3.2.2 CRC generation

Error detection is provided on DCI transmissions through a Cyclic Redundancy Check (CRC).

The entire payload is used to calculate the CRC parity bits. Denote the bits of the payload by $a_0, a_1, a_2, a_3, ..., a_{A-1}$, and the parity bits by $p_0, p_1, p_2, p_3, ..., p_{L-1}$. A is the payload size and L is the number of parity bits.

The parity bits are computed and attached according to section 5.1.1 setting L to 16 bits, resulting in the sequence $b_0, b_1, b_2, b_3, ..., b_{B-1}$, where $B = A + L$.

In the case where closed-loop UE transmit antenna selection is not configured or applicable, after attachment, the RNTI $x_{rnti,0}, x_{rnti,1}, ..., x_{rnti,15}$ is scrambled with the encryption sequence $e_0, e_1, ..., e_{15}$ to produce the encrypted RNTI (eRNTI) $x_{ernti,0}, x_{ernti,1}, ..., x_{ernti,15}$.

$x_{ernti,k} = (x_{rnti,k} + e_k) \bmod 2$ for $k = 0, 1, ..., 15$.

FROM FIG. 5A

In the case where closed-loop UE transmit antenna selection is not configured or applicable, after attachment, the CRC parity bits are scrambled with the corresponding eRNTI $x_{rnti,0}, x_{rnti,1}, ..., x_{rnti,15}, x_{ernti,0}, x_{ernti,1}, ..., x_{ernti,15}$, where $x_{rnti,0}, x_{ernti,0}$ corresponds to the MSB of the eRNTI, to form the sequence of bits $c_0, c_1, c_2, c_3, ..., c_{B-1}$. The relation between $c_k$ and $b_k$ is:

$c_k = b_k$ for $k = 0, 1, 2, ..., A-1$ $c_k = (b_k + x_{ernti,k-A}) \bmod 2$ for $k = A, A+1, A+2, ..., A+15$.

In the case where closed-loop UE transmit antenna selection is configured and applicable, after attachment, the CRC parity bits with DCI format 0 are scrambled with the antenna selection mask $x_{AS,0}, x_{AS,1}, ..., x_{AS,15}$ as indicated in Table 5.3.3.2-1 and the corresponding eRNTI $x_{rnti,0}, x_{rnti,1}, ..., x_{rnti,15}, x_{ernti,0}, x_{ernti,1}, ..., x_{ernti,15}$ to form the sequence of bits $c_0, c_1, c_2, c_3, ..., c_{B-1}$. The relation between $c_k$ and $b_k$ is:

$c_k = b_k$ for $k = 0, 1, 2, ..., A-1$ $c_k = (b_k + x_{ernti,k-A} + x_{AS,k-A}) \bmod 2$ for $k = A, A+1, A+2, ..., A+15$.

Table 5.3.3.2-1: UE transmit antenna selection mask.

| UE transmit antenna selection | Antenna selection mask $<x_{AS,0}, x_{AS,1}, ..., x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

ENCRYPTION IN WIRELESS COMMUNICATION SYSTEMS

TECHNICAL FIELD

This disclosure relates to encryption in wireless communication systems and, more specifically, to encryption on physical layer channels.

BACKGROUND

Security is an essential feature for communication systems involving wireless connections, because the over-the-air nature of wireless transmissions makes the communications more easily compromised. A malicious entity could attempt to receive user plane data (for example, voice or data files) intended for a third party as an eavesdrop. A malicious entity could also attempt to receive control plane data intended for a third party, as a way to spy on activities of the third party. These vulnerabilities can be generally solved by encrypting which prevents user plane and/or control plane data being sent in unencrypted plain text over the air and read by a malicious entity.

DESCRIPTION OF DRAWINGS

FIGS. 5A and 5B show an example description of cyclic redundancy check (CRC) attachment according to some implementations.

Like reference numbers and designations in the various drawings indicate like elements.

DETAILED DESCRIPTION

The present disclosure is directed to encryption in wireless communication systems. In wireless communication systems, a physical layer device identifier can be assigned to a user equipment (UE) to identify the UE on physical layer channels. For example, in 3rd Generation Partnership Project (3GPP) Long-Term Evolution (LTE), a radio network temporary identifier (RNTI) is an identifier to identify a UE in a radio access network. A base station can assign an RNTI to a UE when the UE is in a cell coverage of the base station or when the UE is in communication with the base station. In other words, an RNTI is a cell-specific identity. In some cases, an RNTI is transmitted over the air and can be intercepted by an attacker. For example, an RNTI is assigned to the UE during the random access procedure in which multiple unencrypted messages are exchanged and the RNTI may be intercepted from the unencrypted messages. After an RNTI has been allocated to the UE, the RNTI is transmitted in every physical downlink control channel (PDCCH) from the base station to the UE. Although the RNTI is not transmitted in plain text and is combined (e.g., using an XOR or exclusive or operation) with cyclic redundancy check (CRC) parity bits, in the case that the attacker can assume that the message is received error-free, it may be possible for the attacker to exploit redundancy in the CRC algorithm to recover the RNTI.

A number of security attacks can happen following the interception of the physical layer device identifier. For example, once the RNTI is known, any messages addressed to the specific RNTI in a given cell can be tracked by the attacker. With the RNTI information, a malicious user could track information as to how-long a user stays at a given cell (e.g., causing privacy problems). The attacker may also perform certain denial of service style attacks, e.g., by sending messages scrambled with the intercepted RNTI pretending to be the legitimate UE. Therefore, it is desirable to enhance confidentiality of a physical layer device identifier when the device identifier is transmitted over the air, for example, over a physical layer control channel such as PDCCH.

In wireless communication systems, security can be achieved by using keys or parameters that are shared between the UE and the network to cipher/decipher user plane and/or control plane data. A number of parameters can be input to the encryption algorithm. It is a generally accepted principle that any two messages/data streams are desired to be independently encrypted using different input parameters, to decrease security vulnerabilities for an attacker to decipher these messages/data streams. In other words, it is desired that at least one of the input parameters or the combination of input parameters to the encryption algorithm is different among possible occurrences of encryption. Note that the message/data to be encrypted does not count as a different input parameter even though its content can be different, as redundancy in the message structure or content in the message can be exploited by a deciphering attacker.

Figure 1:
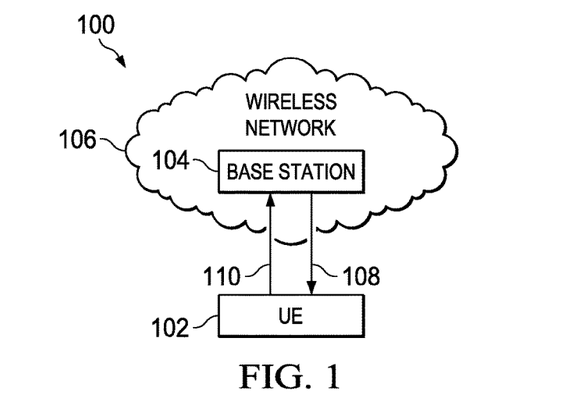
FIG. 1 is an example wireless communication system that includes encryption according to some implementations.

FIG. 1 is an example wireless communication system 100 that includes encryption according to some implementations. The example communication system 100 includes a UE 102 and a wireless network 106 including a base station 104, where the UE 102 is in the cell coverage of the base station 104 or connected to the base station 104. The base station 104 can encrypt user plane and/or control plane data and send encrypted data 108 to the UE 102. Similarly, the UE 102 can encrypt user plane and/or control plane data and send encrypted data 110 to the base station 104.

In some implementations, a base station can encrypt data of a physical layer control channel using at least one of a control channel type, a radio resource aggregation level of the control channel, a radio resource index of the control channel, or a subcarrier frequency of the control channel. The base station can transmit the encrypted data to a UE that is in a cell of the base station. For example, in LTE, the control channel type can be a downlink control information (DCI) format, the radio resource aggregation level of the control channel can be a control channel element (CCE) aggregation level, and the radio resource index of the control channel can be a CCE index. The base station can further encrypt the data of the control channel using at least one of a current time, a frame number, a subframe number, or a reference parameter generated based on a frame number.

The data of the control channel to be encrypted can be at least one of a user identity identifying the UE or a message payload of the control channel. In some cases, the user identity is an RNTI. In some implementations, the base station can scramble the encrypted RNTI with CRC parity bits, where the CRC parity bits are generated based on the message payload of the control channel.

In some implementations, a UE can receive data of a physical layer control channel. The received data can include an encrypted user identity generated by encrypting a user identity identifying the UE using at least one of a control channel type, a radio resource aggregation level of the control channel, a radio resource index of the control channel, or a subcarrier frequency of the control channel. The UE can determine the encrypted user identity. The UE can further determine a message payload of the control channel using the determined encrypted user identity. For example, in LTE, the control channel type can be a downlink control information (DCI) format, the radio resource aggregation level of the control channel can be a control channel element (CCE) aggregation level, and the radio resource index of the control channel can be a CCE index. The user identity can be a radio network temporary identifier (RNTI). The encrypted user identity can be generated further using at least one of a current time, a frame number, a subframe number, or a reference parameter generated based on a frame number. In some cases, the received data can include the encrypted user identity scrambled with CRC parity bits, and the CRC parity bits are generated based on the message payload of the control channel.

The encryption in wireless systems according to methods and systems described herein enables secure wireless communications between a UE and a base station, and prevents a malicious user from tracking information exchanged between the UE and the base station. As opposed to traditional ciphering of user identities such as international mobile subscriber identity (IMSI) or Temporary Mobile Subscriber Identity (TMSI) on higher layers, the described approach ciphers a user identity at a physical layer such as the cell-specific RNTI, and improves security on the physical layer. FIGS. 2-9 and associated descriptions provide additional details for these implementations.

Turning to a general description of the elements, a UE 102 may be referred to but is not limited to as a mobile electronic device, user device, mobile station, subscriber station, portable electronic device, mobile communications device, wireless modem, push-to-talk (PTT) dispatch console, or wireless terminal. Examples of a UE may include but are not limited to a cellular phone, personal data assistant (PDA), smart phone, PTT dispatch console, laptop, tablet personal computer (PC), pager, portable computer, portable gaming device, wearable electronic device, test equipment, gambling machine, car/vehicle, notice board, home appliance or other mobile communications device having components for communicating voice or data via a wireless communication network. The wireless communication network may include a wireless link over at least one of a licensed spectrum and an unlicensed spectrum.

Other examples of a UE include mobile and fixed electronic devices. A UE may include a Mobile Equipment (ME) device and a removable memory module, such as a Universal Integrated Circuit Card (UICC) that includes a subscriber identity module (SIM), a Universal SIM (USIM), or a Removable User Identity Module (R-UIM). The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 106 may include one or a plurality of radio access networks (RANs), other access networks such as fixed Ethernet or IEEE 802.11 WLAN, core networks (CNs), and external networks. The RANs may include one or more radio access technologies. In some implementations, the radio access technologies may be but are not limited to GSM, Interim Standard 95 (IS-95), Universal Mobile Telecommunications System (UMTS), CDMA2000 (Code Division Multiple Access), Evolved UMTS, LTE, or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station (e.g., the base station 104) may be a radio base station that may control all or at least some radio-related functions in a fixed part of the system. The base station may provide radio interface within their coverage area or a cell for a UE to communicate. The base station or plurality of base stations may constitute the cellular network to provide a wide area of coverage. The base station directly communicates with one or a plurality of UEs, other base stations, and one or more core network nodes.

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. Although in some of the following description LTE is used as an example, as will be understood by those of ordinary skill in the art, the described approach can also be used for other wireless communication systems such as $5^{th}$ Generation or IEEE wireless systems. Although in some of the following description RNTI is used as an example for user identity, the described approach can be also used for user identities such as paging RNTI (P-RNTI), cell RNTI (C-RNTI), group RNTI (G-RNTI), random access RNTI (RA-RNTI), system information RNTI (SI-RNTI), sidelink RNTI (SL-RNTI) or other identities in existing or future wireless systems. As will be understood by those of ordinary skill in the art, the described approach can be used for physical layer data channels (e.g., LTE PDSCH or PUSCH), physical layer control channels (e.g., LTE PDCCH or PUCCH), uplink channels, downlink channels, channels between a bases station and a UE, channels between two base stations, channels between two UEs, or other wireless or wired channels. Further, as will be understood by those of ordinary skill in the art, encryption refers to similar operations as enciphering. One way to perform encryption is to use scrambling. One example of scrambling is based on modulo operation. For example, if a first sequence $x1, x2, \ldots, xn$ is scrambled with a second sequence $y1, y2, \ldots yn$, the result of the scrambling is a third sequence $z1, z2, \ldots, zn$, where $zi=(xi+yi) \mod 2, i=1, \ldots, n$.

Figure 2:
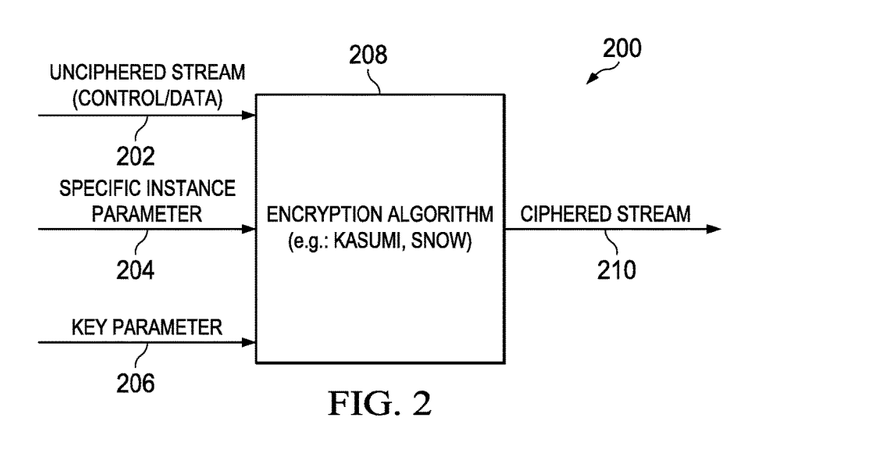
FIG. 2 is a data flow diagram illustrating encryption in wireless communication systems according to some implementations.

FIG. 2 is a data flow diagram 200 illustrating encryption in wireless communication systems according to some implementations. The data flow diagram 200 includes an encryption module 208 that can perform encryption algorithms such as KASUMI, SNOW, or other encryption algorithms. The input streams of the encryption module 208 include unciphered stream 202, specific instance parameter 204, and key parameter 206. The output steam of the encryption module 208 includes ciphered steam 210. The unciphered stream 202 can include user plane or control plane data, physical layer device identifier (e.g., RNTI), or others. The key parameter 206 can be a static key shared between the UE and the wireless network, e.g., during a communication session or an LTE radio resource control (RRC) connection. For example, the key parameter 206 can be the same for different encryption occurrences during an RRC connection. To reduce security vulnerabilities, the specific instance parameter 204 can include additional parameters changing from one encryption occurrence to another within a communication session. The specific instance parameter 204 can include one or more of the following parameters or a combination of one or more of the following parameters.

a) Channel Type

The specific instance parameter 204 can include a parameter indicating a channel type or a channel identity of a physical channel associated with the unciphered stream 202. For example, if the unciphered stream 202 is an RNTI that is to be transmitted on a PDCCH, the specific instance parameter 204 can be a downlink control information (DCI) format of the PDCCH. 3GPP TS 36.213, subclause 5.3.3, defines 20 different DCI formats such as Format 0, 1, 1A, 1B, 1C, 1D, 2, 2A, 2B, 2C, 3, 3A, 4, etc., hence the specific instance parameter 204 can be a 5-bit input parameter to the encryption module 208 to indicate one of the 20 different DCI formats (5 bits can indicate up to $2^5=32$ DCI formats).

b) Channel Radio Resources

Alternatively, or in combination, the specific instance parameter 204 can include a parameter indicating a radio resource aggregation level of a physical channel associated with the unciphered stream 202. For example, if the unciphered stream 202 is an RNTI that is to be transmitted on a PDCCH, the specific instance parameter 204 can be a parameter indicating a control channel element (CCE) aggregation level of the PDCCH, where the CCE aggregation level refers to the number of CCEs of a PDCCH. LTE defines four possible aggregation levels, i.e., 1, 2, 4, or 8 CCEs. Therefore, the specific instance parameter 204 can be a 2-bit input parameter to the encryption module 208 to indicate one of the four different aggregation levels.

Alternatively, or in combination, the specific instance parameter 204 can include a parameter indicating a radio resource index of a physical channel associated with the unciphered stream 202. For example, if the unciphered stream 202 is an RNTI that is to be transmitted on a PDCCH, the specific instance parameter 204 can be a parameter indicating a CCE index of the PDCCH, e.g., an index of the first CCE of the PDCCH. In LTE, a CCE index can take a value up to 84, and the specific instance parameter 204 can be a 7-bit input parameter to the encryption module 208 to indicate one of the 84 possibilities for the CCE index.

Alternatively, or in combination, the specific instance parameter 204 can include a combination of more than one parameter, e.g., a combination of channel type, CCE aggregation level, and CCE index. In this case, the specific instance parameter 204 can be a 5+2+7=14-bit input parameter to the encryption module 208 to indicate one of the different possibilities of the 3-tuple parameter including DCI format, CCE aggregation level, and CCE index.

In some wireless communication systems, parameters of channel type and channel radio resources may not be sufficient to provide different parameters for possible encryption occurrences. For example, in LTE, one subframe can include multiple PDCCHs, and a combination of channel type, CCE aggregation level, and CCE index is sufficient to provide different encryption parameters for different PDCCHs within a subframe. However, this combination is not sufficient to provide different parameters for PDCCHs in different subframes, for example, two PDCCHs in two subframes can have the same DCI format, CCE aggregation level, and CCE index. To solve this issue, the specific instance parameter 204 can further include the following parameters.

c) Frame Number

Alternatively, or in combination, the specific instance parameter 204 can include a time-based parameter, e.g., a frame number, subframe number, or a reference parameter based on the frame number and/or subframe number, so that the specific instance parameter 204 can be different for different frames/subframes. For example, in LTE, a frame lasts 10 ms and the coding of a frame number uses 10 bits (i.e., the maximum value of the frame number is $2^{10}=1024$), therefore a frame number repeats itself every 10 ms×$2^{10}$=10.24 seconds. To increase the time duration before which there are possibilities that the combination parameter of frame/subframe number, DCI format, CCE aggregation level, and CCE index repeats itself, it is possible to add other input parameters as additional most significant bits (MSBs) to the frame number.

For example, a reference parameter based on the frame number can extend the frame number with additional bits, for example with additional MSBs. The reference parameter can be used by both the network and the device in conjunction with the frame number. For example, the reference parameter can increase by one after the frame number has reached its maximum value (e.g., 1024 for LTE). The reference parameter is reset to zero after that it has reached a maximum value of the reference parameter. The maximum value of the reference parameter can be specified in the standards (for example, the reference parameter can have 16 bits and the maximum value is $2^{16}=65,536$), or taken from a parameter in a Master Information Block (MIB) or System Information Broadcast (SIB). Similarly, the initial value of the reference parameter can be specified in the standards (for example, it can be all "0" bits value, or any other value), or taken from a parameter in the MIB or SIB.

In some implementations, the reference parameter can be initially set as the value of the RNTI or other values. The reference parameter can be coded with 16 bits (the same number of bits as the number of bits for the RNTI), and the combination of the frame/subframe number and the reference parameter can repeat itself every 10.24 secs×$2^{16}$=7.77 days. In other words, if the specific instance parameter 204 includes a combination of the frame number and the reference parameter, the specific instance parameter 204 will not repeat itself for 7.77 days. Since it is unlikely that an LTE RRC connection would last as long as 7.77 days, this provides enough robustness to ensure that the input parameter combination would not repeat itself.

In some other implementations, the number of bits of the reference parameter can be increased to, e.g. 20 bits, which would ensure that the input parameter combination is not repeated before 10.24 secs×$2^{20}$=4.14 months. One way to enable the 20-bit reference parameter is to use the 16-bit RNTI as an initial value, together with four appended pre-set bits (for example, all four bits can be initially set to 0). With the 20-bit reference number, multiple control channels can be transmitted in any subframe without the risk of repeating the instance parameter 204 for at least a period of 4.14 months.

d) Current Time:

Alternatively, or in combination, the specific instance parameter 204 can include a current time. In some cases, a common timing reference between the device and the network can be used.

e) Frequency:

Alternatively, or in combination, the specific instance parameter 204 can include a parameter indicating a subcarrier frequency of the radio resource used by the physical channel such as PDCCH. In case of carrier aggregation, the specific instance parameter 204 can also include a parameter indicating a frequency of a component carrier on which the physical channel is sent.

One or more of the specific instance parameters 204 described above can be input to the encryption module 208. In some implementations, these specific instance parameters can be used in addition to the parameters already used in the system, e.g., a cipher key such as a symmetric key Kasme or KeNB of LTE as defined in 3GPP TS 33.401. The specific instance parameters 204 to the encryption module 208 can apply in different ways, for example, applying in parallel into the encryption algorithm, or concatenating more than one parameter and inputting them altogether into the encryption algorithm. In FIG. 2, the encryption algorithm is run until the end to find one output. In an alternative, the DCI format could be used to indicate which block output from the cipher to select (16 encrypted bits for each potential DCI format). Other alternatives are possible including using one or more of the specific instance parameter to indicate which block output from the cipher to select.

Figure 3:
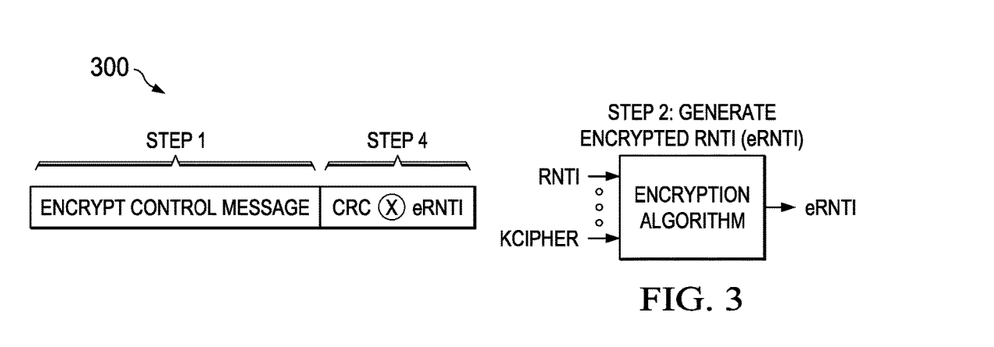
FIG. 3 is a block diagram illustrating encrypting a user identity and a control message according to some implementations.

FIG. 3 is a block diagram 300 illustrating encrypting a user identity and a control message according to some implementations. In some existing wireless systems, a physical layer control channel (e.g., PDCCH) includes a control message (i.e., message payload) and CRC parity bits, where the CRC is generated based on the control message and appended to the control message for the purpose of error detection. Before the base station transmits the PDCCH to a target UE, the base station scrambles the CRC with a user identity (e.g., RNTI) of the target UE using an XOR operation (i.e., CRC XOR RNTI) so that the target UE can decode the PDCCH but not the other UEs. To increase security on physical layer, FIG. 3 illustrates steps of encrypting a physical layer control channel, including encrypting the user identity and scrambling the encrypted user identity with the CRC parity bits.

As shown in FIG. 3, at step 1, the base station encrypts a control message (i.e., message payload) of a physical layer control channel, such as PDCCH. Step 1 can use the method discussed in FIG. 2, where the unciphered stream 202 is the control message. At step 2, the base station encrypts a user identity, such as RNTI. Step 2 can use the method discussed in FIG. 2, where the unciphered stream 202 is RNTI. At step 3, the base station derives the CRC (e.g., 16 bits) based on the encrypted control message from step 1. At step 4, the base station scrambles the encrypted RNTI (eRNTI) from step 2 with the CRC from step 3, for example, using CRC XOR eRNTI. In other words, CRC XOR eRNTI can also be of the form CRC XOR RNTI XOR <some encrypted, key-derived content>. The base station can include the encrypted control message from step 1 and the scrambled CRC from step 4 in the physical layer control channel and send to the UE. Note that the order of steps shown in FIG. 3 is an example and other ordering of steps is possible. For example, step 3 of deriving CRC may be performed before step 2 of encrypting RNTI.

When the UE receives the physical layer control channel data, the UE separates the encrypted control message and the scrambled CRC (i.e., CRC XOR eRNTI) based on, for example, a predefined number of bits for CRC. The UE can determine its eRNTI by performing the same encryption as the base station. Assuming no transmission error occurs during transmission of the control channel data, the UE can compute CRC parity bits based on the encrypted control message and XOR the computed CRC with the scrambled CRC. If the result from the XOR operation matches the UE's eRNTI, then the control channel is intended for the UE and the UE decodes the control message. Otherwise the control channel is not intended for the UE and the UE ignores the control message. Alternatively, the UE can XOR its eRNTI with the scrambled CRC. If the result from the XOR operation matches the CRC computed based on the encrypted control message, then the UE proceeds to decode the control message as it is intended for the UE. Otherwise, the UE ignores the control message. The UE can decrypt the encrypted control message using the same encryption parameters the base station used. Note that the error control code redundancy (e.g., redundancy in CRC) cannot be used by a malicious attacker as it will not be able to retrieve a transmitted RNTI. From the attacker's perspective without knowledge of the RNTI there is no redundancy in the CRC codeword which can be used in an attack. In other words, the redundancy in the error control codeword has been removed from the point of view of an outside attacked by adding in the RNTI.

In some cases, the eRNTIs are made of 16 bits, and any two eRNTI instances have a probability of $\frac{1}{2}^{16}$ of being the same. Similar to what occurs in LTE Rel-8, there will be instances where a UE decodes a control message not intended for it. In LTE Rel-8 this occurs in several scenarios:

A control message is decoded by UE1 at the edge of a cell for RNTI1, but was intended for UE2/RNTI2 (because the RNTI got corrupted from RNTI2 to RNTI1). UE1 receiving the message not intended for it will fail the decoding, transmit a negative-acknowledgement (NACK), and not proceed further.

A control message is decoded by UE1/RNTI1 when no control message was sent (noise decoded). In this case UE1 will attempt decoding of the data channel (e.g. PDSCH), which will fail. A UE receiving the message not intended for it will fail the decoding, transmit a NACK, and not proceed further.

As an embodiment, the network could avoid any collision between two eRNTIs by not scheduling a control channel transmission for a specific subframe for a UE if this would otherwise lead to the use of the same eRNTI used by one (or more) UE for this specific subframe. As another embodiment, the network could modify some parameters used as an input to the encryption algorithm (e.g. DCI format, CCE resources) if this otherwise would lead to the use of the same eRNTI used by one (or more) UE (to avoid a collision between eRNTIs).

Figure 4:
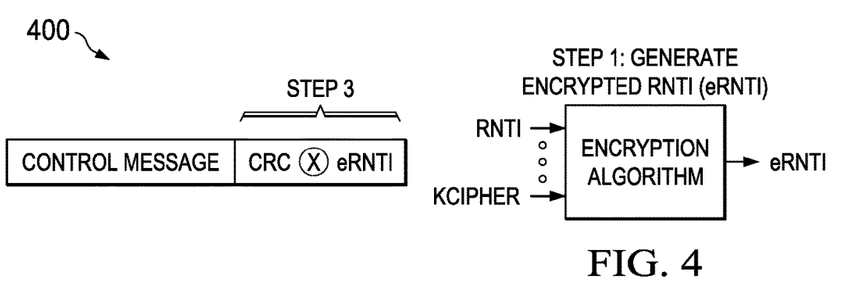
FIG. 4 is a block diagram illustrating encrypting a user identity according to some implementations.

FIG. 4 is a block diagram 400 illustrating encrypting a user identity according to some implementations. FIG. 4 is similar to FIG. 3 except that the control message is not encrypted. At step 1, the RNTI is encrypted to generate an eRNTI. Step 1 can use the method discussed in FIG. 2, where the unciphered stream 202 is RNTI. At step 2, the CRC is computed using the unprotected control message. At step 3, the CRC parity portion is XORed with the eRNTI. As will be understood by those of ordinary skill in the art, the described approaches in FIGS. 3 and 4 can be performed either by a base station to encrypt downlink channels or by a UE to encrypt uplink channels.

FIGS. 5A and 5B show an example description of CRC attachment according to some implementations. For example, FIG. 5 shows changes to 3GPP TS 36.212 that can include the following description for encryption sequence:

Inputs to generate the encryption sequence $e_0, e_1, \ldots, e_{15}$ that will be used to encrypt the RNTI are:

Key: The key used is a 128-bit key and is computed by the UE.

Channel type (DCI Format), 5 bits, forms an input to the encryption algorithm.

Control Channel Element (CCE) resources indicator. This is a 2 bit field that indicates whether 1, 2, 4 or 8 resources are used in the cell (mapping respectively to 00, 01, 10 and 11).

Subframe & Frame numbers. They indicate the subframe & frame in which the particular DCI control channel is transmitted/received.

The subframe number consists of 4 bits indicating subframe 0, . . . , 9.

The frame number is the SFN (system frame number) consisting of 10 bits.

Reference parameter. Consists of 16 bits. This takes initially the value of the RNTI and gets incremented by one each time that the frame number wraps around. After the reference parameter reaches its maximum value, the reference parameter takes the value of 16 bits equal to '0' (i.e. it wraps around).

16 bits are outputted from the cipher to produce $e_0, e_1, \ldots, e_{15}$.

3GPP TS 36.212 can include the following description for CRC generation:

Error detection is provided on DCI transmissions through a Cyclic Redundancy Check (CRC).

The entire payload is used to calculate the CRC parity bits. Denote the bits of the payload by $a_0, a_1, a_2, a_3, \ldots, a_{A-1}$ and the parity bits by $p_0, p_1, p_2, p_3, \ldots p_{L-1}$. A is the payload size and L is the number of parity bits.

The parity bits are computed and attached according to section 5.1.1 setting L to 16 bits, resulting in the sequence $b_0, b_1, b_2, b_3, \ldots, b_{B-1}$, where $B=A+L$.

In the case where closed-loop UE transmit antenna selection is not configured or applicable, after attachment, the RNTI $x_{rnti,0}, x_{rnti,1}, \ldots, x_{rnti,15}$ is scrambled with the encryption sequence $e_0, e_1, \ldots, e_{15}$ to produce the encrypted RNTI (eRNTI) $x_{ernti,0}, x_{ernti,1}, \ldots, x_{ernti,15}$.

$x_{ernti,k}=(x_{rnti,k}+e_k) \mod 2$ for $k=0, 1, \ldots, 15$.

In the case where closed-loop UE transmit antenna selection is not configured or applicable, after attachment, the CRC parity bits are scrambled with the corresponding eRNTI $x_{ernti,0}, x_{ernti,1}, \ldots, x_{ernti,15}$, where $x_{ernti,0}$ corresponds to the MSB of the eRNTI, to form the sequence of bits $c_0, c_1, c_2, c_3, \ldots, c_{B-1}$. The relation between $c_k$ and $b_k$ is:

$c_k=b_k$ for $k=0, 1, 2, \ldots, A-1$
$c_k=(b_k+x_{ernt,k-A}) \mod 2$ for $k=A, A+1, A+2, \ldots, A+15$.

In the case where closed-loop UE transmit antenna selection is configured and applicable, after attachment, the CRC parity bits with DCI format 0 are scrambled with the antenna selection mask $x_{AS,0}, x_{AS,1}, \ldots, x_{AS,15}$ as indicated in Table 5.3.3.2-1 and the corresponding eRNTI $x_{ernti,0}, x_{ernti,1}, \ldots, x_{ernti,15}$ to form the sequence of bits $c_0, c_1, c_2, c_3, \ldots c_{B-1}$. The relation between $c_k$ and $b_k$ is:

$c_k=b_k$ for $k=0, 1, 2, \ldots, A-1$
$c_k=(b_k+x_{ernt,k-A}+x_{AS,k-A}) \mod 2$ for $k=A, A+1, A+2, \ldots, A+15$.

Figure 6:
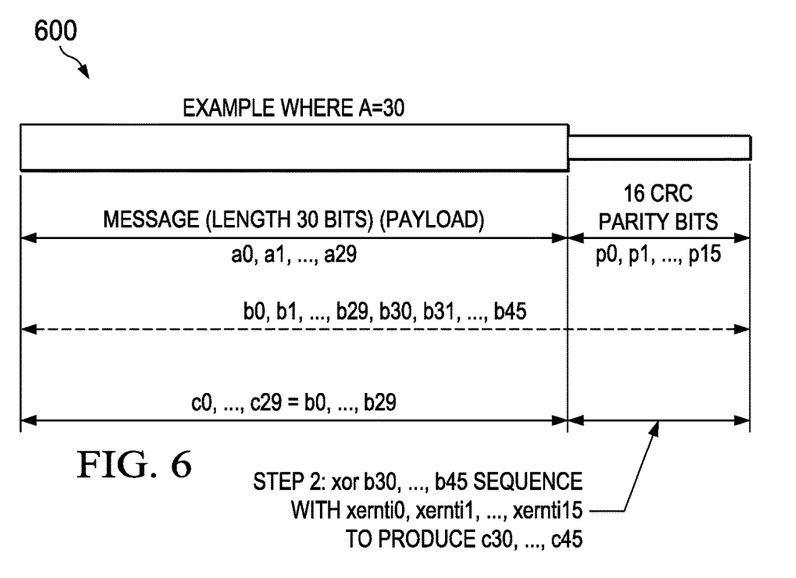
FIG. 6 illustrates an example of CRC generation according to some implementations.

FIG. 6 illustrates an example of CRC generation according to some implementations. For the example in FIG. 6, the payload size A equals 30.

Figure 7:
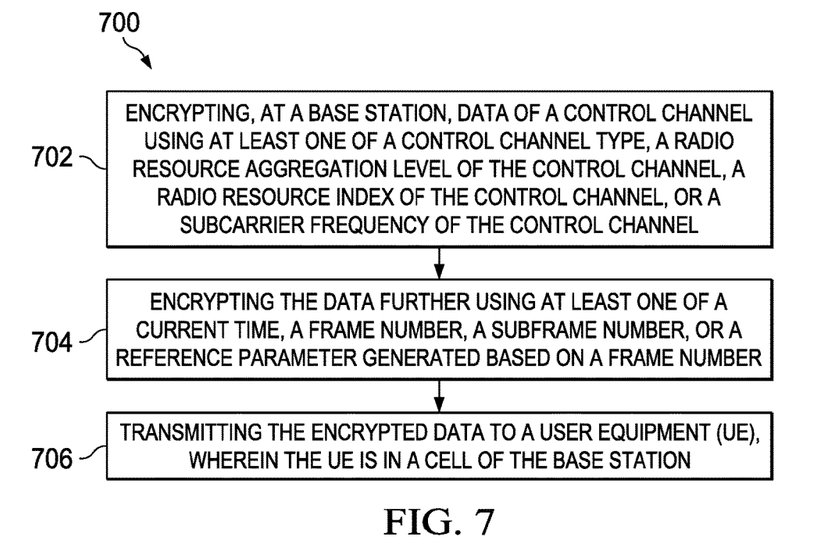
FIG. 7 is a flowchart illustrating an example method for encryption in wireless commination systems according to some implementations.

FIG. 7 is a flowchart illustrating an example method 700 for encryption in wireless commination systems according to some implementations. The method 700 starts at block 702, where a base station encrypts data of a physical layer control channel using at least one of a control channel type, a radio resource aggregation level of the control channel, a radio resource index of the control channel, or a subcarrier frequency of the control channel, as discussed in FIG. 2. The data to be encrypted can be a message payload of the physical layer control channel or a user identity as shown in FIGS. 3 and 4. At block 704, the base station further encrypts the data using at least one of a current time, a frame number, a subframe number, or a reference parameter generated based on a frame number, as discussed in FIG. 2. At block 706, the base station transmits the encrypted data to a UE that is in a cell of the base station.

Figure 8:
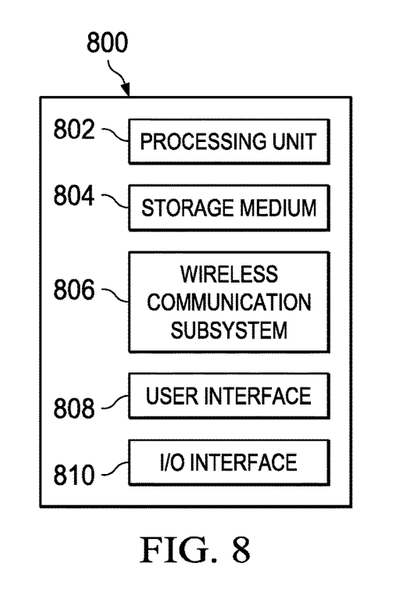
FIG. 8 is a schematic illustrating an example user equipment (UE) apparatus according to some implementations.

FIG. 8 is a schematic illustrating an example UE 800 apparatus according to some implementations. The example UE 800 includes a processing unit 802, a computer-readable storage medium 804 (for example, ROM or flash memory), a wireless communication subsystem 806, an interface 808, and an I/O interface 810. The processing unit 802 can include one or more processing components (alternatively referred to as "processors" or "central processing units" (CPUs)) configured to execute instructions related to one or more of the processes, steps, or actions described above in connection with one or more of the implementations disclosed herein. The processing unit 802 can also include other auxiliary components, such as random access memory (RAM) and read only memory (ROM). The computer-readable storage medium 804 can be embodied by a non-transitory medium configured to store an operating system (OS) of the device 800 and various other computer-executable software programs for performing one or more of the processes, steps, or actions described above.

The wireless communication subsystem 806 may be configured to provide wireless communications for data information or control information provided by the processing unit 802. The wireless communication subsystem 806 can include, for example, one or more antennas, a receiver, a transmitter, a local oscillator, a mixer, and a digital signal processing (DSP) unit. In some implementations, the subsystem 806 can support multiple input multiple output (MIMO) transmissions. In some implementations, the receivers in the wireless communication subsystems 806 can be an advance receiver or a baseline receiver. Two receivers can be implemented with identical, similar, or different receiver processing algorithms.

The user interface 808 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 810 can include, for example, a universal serial bus (USB) interface. A skilled artisan will readily appreciate that various other components can also be included in the example UE device 800.

Figure 9:
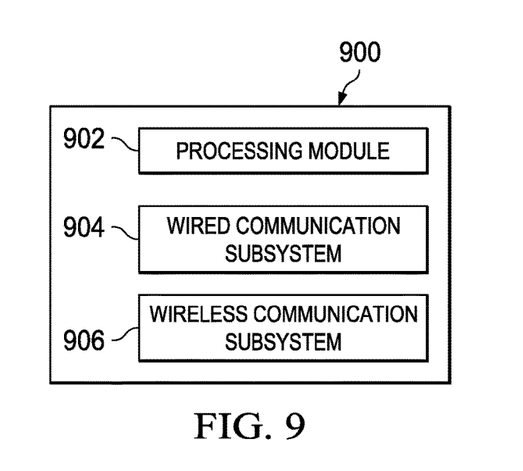
FIG. 9 is a schematic illustrating an example network node according to some implementations.

FIG. 9 is a schematic illustrating an example network node 900 according to some implementations. The illustrated device 900 includes a processing module 902, a wired communication subsystem 904, and a wireless communication subsystem 906. The wireless communication subsystem 906 can receive data traffic and control traffic from the UE.

In some implementations, the wireless communication subsystem 906 may include a receiver and a transmitter. The wired communication subsystem 904 can be configured to transmit and receive control information between other access node devices via backhaul connections. The processing module 902 can include one or more processing components (alternatively referred to as "processors" or "central processing units" (CPUs)) capable of executing instructions related to one or more of the processes, steps, or actions described above in connection with one or more of the implementations disclosed herein. The processing module 902 can also include other auxiliary components, such as random access memory (RAM), read only memory (ROM), secondary storage (for example, a hard disk drive, flash memory or other non-transitory storage medium). The processing module 902 can execute certain instructions and commands to provide wireless or wired communication, using the wired communication subsystem 904 or a wireless communication subsystem 906. Various other components can also be included in the device 900.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

The invention claimed is:

1. A method, comprising:
   encrypting, by a base station, data of a physical layer control channel using at least one of a control channel type, a radio resource aggregation level of the control channel, a radio resource index of the control channel, or a subcarrier frequency of the control channel, wherein the data comprises at least a user identity identifying a user equipment (UE), and the encrypting the data of the physical layer control channel comprises generating an encrypted user identity;
   scrambling a plurality of cyclic redundancy check (CRC) parity bits by using the encrypted user identity; and
   transmitting the scrambled CRC to the UE, wherein the UE is in a cell of the base station.

2. The method of claim 1, wherein the control channel type is a downlink control information (DCI) format, the radio resource aggregation level of the control channel is a control channel element (CCE) aggregation level, and the radio resource index of the control channel is a CCE index.

3. The method of claim 1, further comprising:
   encrypting the data using a current time.

4. The method of claim 1, further comprising:
   encrypting the data using at least one of a frame number or a subframe number.

5. The method of claim 1, further comprises:
   encrypting the data using a reference parameter generated based on a frame number.

6. The method of claim 1, wherein the data further comprises:
   a message payload of the control channel.

7. The method of claim 1, wherein the user identity is a radio network temporary identifier (RNTI).

8. The method of claim 6,
   wherein the plurality of CRC parity bits are generated based on the message payload of the control channel.

9. A base station, comprising:
   a memory; and
   at least one hardware processor communicatively coupled with the memory and configured to:
      encrypt data of a physical layer control channel using at least one of a control channel type, a radio resource aggregation level of the control channel, a radio resource index of the control channel, or a subcarrier frequency of the control channel, wherein the data comprises at least a user identity identifying a user equipment (UE), and the encrypting the data of the physical layer control channel comprises generating an encrypted user identity;
      scramble a plurality of cyclic redundancy check (CRC) parity bits by using the encrypted user identity; and
      transmit the scrambled CRC to the UE, wherein the UE is in a cell of the base station.

10. The base station of claim 9, wherein the control channel type is a downlink control information (DCI) format, the radio resource aggregation level of the control channel is a control channel element (CCE) aggregation level, and the radio resource index of the control channel is a CCE index.

11. The base station of claim 9, wherein the at least one hardware processor is further configured to encrypt the data using at least one of a current time, a frame number, a subframe number, or a reference parameter generated based on a frame number.

12. The base station of claim 9, wherein the data further comprises:
   a message payload of the control channel.

13. The base station of claim 12,
   wherein the plurality of CRC parity bits are generated based on the message payload of the control channel.

14. A tangible, non-transitory computer-readable medium containing instructions which, when executed, cause a base station to perform operations comprising:
   encrypting data of a physical layer control channel using at least one of a control channel type, a radio resource aggregation level of the control channel, a radio resource index of the control channel, or a subcarrier frequency of the control channel, wherein the data comprises at least a user identity identifying a user equipment (UE), and the encrypting the data of the physical layer control channel comprises generating an encrypted user identity;

scrambling a plurality of cyclic redundancy check (CRC) parity bits by using the encrypted user identity; and transmitting the scrambled CRC to the UE, wherein the UE is in a cell of the base station.

15. The tangible, non-transitory computer-readable medium of claim 14, wherein the control channel type is a downlink control information (DCI) format, the radio resource aggregation level of the control channel is a control channel element (CCE) aggregation level, and the radio resource index of the control channel is a CCE index.

16. The tangible, non-transitory computer-readable medium of claim 14, wherein the operations further comprise:

encrypting the data using at least one of a current time, a frame number, a subframe number, or a reference parameter generated based on a frame number.

17. The tangible, non-transitory computer-readable medium of claim 14, wherein the data further comprises:

a message payload of the control channel.

18. The tangible, non-transitory computer-readable medium of claim 17, wherein the plurality of CRC parity bits are generated based on the message payload of the control channel.

19. A method, comprising:

receiving, by a user equipment (UE), data of a physical layer control channel, wherein the received data includes a scrambled cyclic redundancy check (CRC), the scrambled CRC is generated by scrambling a plurality of cyclic redundancy check (CRC) parity bits by using an encrypted user identity, and the encrypted user identity is generated by encrypting a user identity identifying the UE using at least one of a control channel type, a radio resource aggregation level of the control channel, a radio resource index of the control channel, or a subcarrier frequency of the control channel;

determining, at the UE, the encrypted user identity; and determining a message payload of the control channel using the determined encrypted user identity.

20. The method of claim 19, wherein the control channel type is a downlink control information (DCI) format, the radio resource aggregation level of the control channel is a control channel element (CCE) aggregation level, and the radio resource index of the control channel is a CCE index.

21. The method of claim 19, wherein the encrypted user identity is generated further using at least one of a current time, a frame number, a subframe number, or a reference parameter generated based on a frame number.

22. The method of claim 19, wherein the user identity is a radio network temporary identifier (RNTI).

23. The method of claim 19, wherein the plurality of CRC parity bits are generated based on the message payload of the control channel.

* * * * *